United States Patent
Buhmann

(10) Patent No.: US 9,683,866 B2
(45) Date of Patent: Jun. 20, 2017

(54) DEVICE AND METHOD FOR CORRECTING A SENSOR SIGNAL

(71) Applicant: Robert Bosch GmbH, Stuttgart (DE)

(72) Inventor: Alexander Buhmann, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1121 days.

(21) Appl. No.: 13/666,764

(22) Filed: Nov. 1, 2012

(65) Prior Publication Data

US 2013/0110441 A1    May 2, 2013

(30) Foreign Application Priority Data

Nov. 2, 2011  (DE) .................. 10 2011 085 547

(51) Int. Cl.
*G01D 3/02* (2006.01)
*G01D 5/24* (2006.01)

(52) U.S. Cl.
CPC ............... *G01D 3/02* (2013.01); *G01D 5/24* (2013.01)

(58) Field of Classification Search
CPC .................................. G01D 3/02; G01D 5/24
See application file for complete search history.

(56) References Cited

U.S. PATENT DOCUMENTS

| | | | |
|---|---|---|---|
| 6,653,958 B1 * | 11/2003 | Morche ............ | H03M 3/388 341/118 |
| 6,901,355 B2 * | 5/2005 | Opitz .............. | G01D 3/022 702/190 |
| 7,212,137 B2 * | 5/2007 | Melanson ......... | H03M 7/3015 341/143 |
| 2008/0272945 A1 * | 11/2008 | Melanson ......... | H02M 1/4225 341/143 |

(Continued)

FOREIGN PATENT DOCUMENTS

| CN | 2084610 U | 9/1991 |
|---|---|---|
| CN | 1402011 A | 3/2003 |

(Continued)

OTHER PUBLICATIONS

Buhmann, et al., "An Unscented Kalman Filter for the Estimation of Circuit Nonidealities with Implicit Decimation in Continuous-Time Multibit Sigma-Delta Modulator", 2007, IEEE, DOI 1-4244-1176-9/07, pp. 1090-1093.*

(Continued)

*Primary Examiner* — Mischita Henson
(74) *Attorney, Agent, or Firm* — Maginot, Moore & Beck LLP

(57) ABSTRACT

A device for correcting a sensor signal, includes a sensor interface, a signal processing unit, a feedback unit, and a signal correction unit. The sensor interface is configured to read in a sensor signal which represents a physical variable. The signal processing unit is configured to determine a processing signal by using the sensor signal. The feedback unit is configured to output a feedback signal to the sensor and to provide the feedback signal on the basis of a nonlinear processing rule and the processing signal. The signal correction unit is configured to determine a corrected signal by using the processing signal, and to determine the corrected signal by using the nonlinear processing rule or a processing rule derived from the nonlinear processing rule.

7 Claims, 2 Drawing Sheets

(56) References Cited

U.S. PATENT DOCUMENTS

2008/0284628 A1* 11/2008 Willig .................. H03M 3/404
　　　　　　　　　　　　　　　　　　　　　　341/143
2010/0060495 A1    3/2010 Asami et al.

FOREIGN PATENT DOCUMENTS

CN　　　　201718562 U　　1/2011
DE　　WO 2010018482 A2 *　2/2010　 ............ H03M 3/364

OTHER PUBLICATIONS

Martin Handtmann, Dynamische Regelung mikroelektromechanischer Systeme (MEMS) mit Hilfe kapazitiver Signalwandlung und Kraftrückkopplung, Oct. 1, 2002, 245 Pages, Technical University of Munich, Germany.

* cited by examiner

DEVICE AND METHOD FOR CORRECTING A SENSOR SIGNAL

This application claims priority under 35 U.S.C. §119 to patent application no. DE 10 2011 085 547.5, filed on Nov. 2, 2011 in Germany, the disclosure of which is incorporated herein by reference in its entirety.

BACKGROUND

The present disclosure relates to a device for correcting a sensor signal, a method for correcting a sensor signal, and a corresponding computer program product.

A nonlinearity in the force feedback of a microelectronic sensor (MEM sensor) reduces the noise performance of such a force-compensated sensor. Nonlinearities can arise from various effects, for example when use is made of a plurality of feedback electrodes, or else when there is voltage feedback with a plurality of voltage values given a capacitive converter element. This is circumvented in general in the case of capacitive converters by using PWM feedback (PWM=pulse width modulation) instead of voltage feedback. As a result, there are only two force states which, of course, always have a linear relationship. However, this approach has the disadvantage that the time steps have to be very small when high quantization is required. For example, should the feedback force be quantized with 10 bit, the sub-clock would need to be approximately 400 MHz given a sampling rate of 400 kHz. This is not sensible in terms of technology and limits the feedback quantization to a few bits in the case of PWM.

In the dissertation entitled "Dynamische Regelung mikroelektromechanischer Systeme (MEMS) mit Hilfe kapazitiver Signalwandlung and Kraftrückkopplung" ["Dynamic control of microelectromechanical systems (MEMS) with the aid of capacitive signal conversion and force feedback"] by Martin Handtmann, submitted to the TU Munich on Oct. 1, 2002, various approaches to the dynamic control of microelectromechanical systems are presented.

SUMMARY

Against this background, the present disclosure presents a device for correcting a sensor signal, furthermore a method for correcting a sensor signal and, finally, a corresponding computer program product in accordance with the main claims. Advantageous refinements emerge from the respective subclaims and the following description.

The present disclosure provides a device for correcting a sensor signal, the device having the following features (i) a sensor interface which is designed to read in a sensor signal which represents a physical variable; (ii) a signal processing unit which is designed to determine a processing signal by using the sensor signal; (iii) a feedback unit which is designed to output a feedback signal to the sensor, the feedback unit further being designed to provide the feedback signal on the basis of a nonlinear processing rule and to the processing signal; and (iv) a signal correction unit which is designed to determine a corrected signal by using the processing signal, the signal correction unit further being designed to determine the corrected signal by using the nonlinear processing rule or a processing rule derived from the nonlinear processing rule.

A device may be considered here to be an electrical unit which processes sensor signals and outputs control and/or data signals as a function thereof. The device can have an interface, which can be designed as hardware and/or software. Given a hardware design, the interfaces can, for example, be part of a so-called system ASIC which contains the most varied functions of the device. However, it is also possible for the interfaces to be dedicated, integrated circuits, or to be composed at least partially of discrete components. In the case of a software design, the interfaces can be software modules which are, for example, present on a microcontroller along with other software modules.

The present disclosure further provides a method for correcting a sensor signal, the method having the following steps (i) reading in a sensor signal by an interface, the sensor signal representing a physical variable; (ii) processing the sensor signal by a signal processing unit in order to determine a processing signal by using the sensor signal; (iii) outputting a feedback signal by a feedback unit to the sensor, the feedback unit being designed to provide the feedback signal on the basis of a nonlinear processing rule and the processing signal; and (iv) correcting the processing signal by means of a signal correction unit in order to determine a corrected signal by using the processing signal, the signal correction unit being designed to further determine the corrected signal by using the nonlinear processing rule or a processing rule derived from the nonlinear processing rule.

Consequently, the present disclosure provides a method which can be executed on a corresponding device for correcting a sensor signal, the device having corresponding apparatuses for carrying out or implementing the steps of the method. Again, it is possible through this variant embodiment of the disclosure in the form of a method to quickly and efficiently achieve the object on which the disclosure is based.

Also advantageous is a computer program product with program code which can be stored on a machine readable carrier such as a semiconductor memory, a hard disk memory or an optical memory, and is used to carry out the method according to one of the embodiments described above, the program being executed on a computer or a device.

A nonlinear processing rule can be understood as a nonlinear relationship between a signal to be processed and a processed signal. The corrected signal can be understood in this case as a correction of the sensor signal. A physical variable can, for example, be understood as a voltage, a current, a force, an acceleration, a rotation rate or another variable to be measured which can be acquired by a sensor, the sensor being capable of outputting a sensor signal corresponding to one of these variables to be measured.

The present disclosure is based on the finding that the use of the correction unit which employs the nonlinear processing rule, or a processing rule derived from the nonlinear processing rule, to determine the corrected signal now renders possible a quick and efficient compensation of the nonlinearity which arises from the feedback into the control circuit of the feedback. In this way, on the one hand a complicated equalization of the signal in the processing unit can be avoided and, on the other hand, it is advantageously possible to dispense with the use of high frequencies when there is pulse width modulation, which means that a low power loss and, at the same time, a high resolution can be implemented.

In accordance with an embodiment of the present disclosure, it is possible for the feedback unit and/or the signal correction unit to use a nonlinear processing rule or a processing rule derived from the nonlinear processing rule which is based on a quadratic relationship between an input variable and an output variable. For example, given a capacitive feedback the nonlinear processing rule can correspondingly map the quadratic voltage profile of a sensor, in the case of which when a physical variable acts the sensor signal is conditioned by a change in its capacitance. Such an embodiment of the present disclosure offers the advantage that a simple nonlinear processing rule can be used to improve the resolution, which is also easy to implement in digital technology.

It is, furthermore, advantageous when, in accordance with one embodiment of the present disclosure, the signal processing unit is designed to determine the processing signal as a time-discrete and/or value-discrete signal. Such an embodiment of the present disclosure offers the advantage of using a digitally implemented correction unit which is easy to configure using the already available approaches of filter design.

The device for correcting the sensor signal is particularly robust and reliable in operation when the signal processing unit is designed to further provide the processing signal by using the processing signal itself. Such an embodiment of the present disclosure enables the processing of information in the processing unit which is available as directly as possible before application of the nonlinear processing rule.

It is, furthermore, advantageous when, in accordance with one embodiment of the present disclosure, the signal processing unit has a digital filter and a quantizer downstream of the digital filter in the signal flow. With the arrangement of the quantizer downstream of the digital filter, there is a very good possibility of providing the processing signal which is fed to the feedback unit, in which the nonlinear processing rule is executed.

The signal correction unit can be implemented particularly easily when, in accordance with one embodiment of the present disclosure, the signal correction unit is formed by a digital filter. Such an embodiment of the present disclosure offers the advantage that a nonlinear processing rule or a processing rule derived from the nonlinear processing rule can also be implemented very easily and cost-effectively.

Furthermore, one embodiment of the present disclosure that is particularly advantageous is one in which there is provided a sensor which is coupled to the interface and the feedback unit, the sensor being designed to provide the sensor signal by interaction with the physical variable and the feedback signal. Such an embodiment of the present disclosure offers the advantage that the sensor and the feedback unit can be tuned to one another, specifically in the feedback unit used nonlinear processing rule.

Particularly when the sensor is designed to acquire a movement of a micromechanical element, in particular to provide the sensor signal by acquiring a change in a capacitance, the advantages of the approach presented here can be advantageously implemented.

BRIEF DESCRIPTION OF THE DRAWINGS

The disclosure is explained in more detail below by way of example with the aid of the attached drawings, in which.

DETAILED DESCRIPTION

In the following description of preferred exemplary embodiments of the present disclosure, identical or similar reference symbols are used for the elements illustrated in the various figures and of similar action, a repeated description of these elements being dispensed with.

Figure 1:
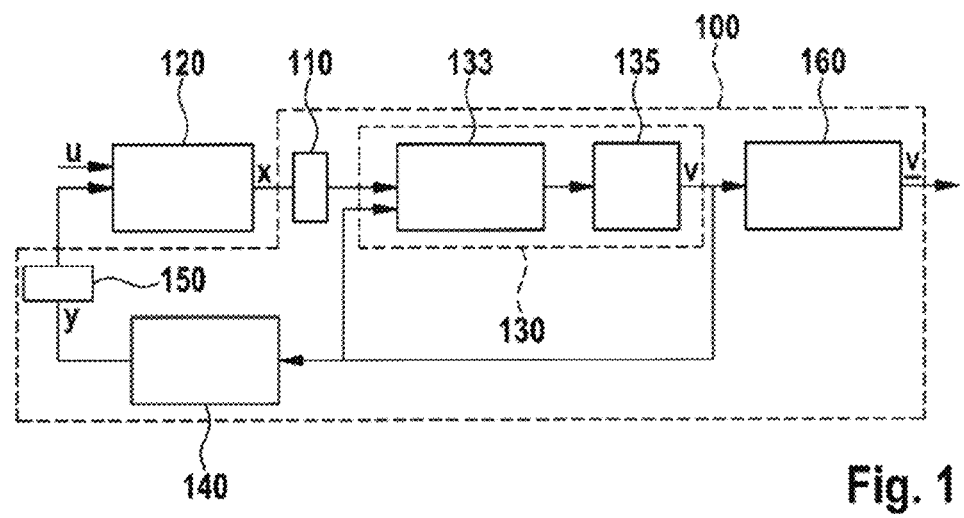
FIG. 1 shows a block diagram of an exemplary embodiment of the present disclosure, as device.

FIG. 1 shows a block diagram of an exemplary embodiment of the present disclosure, as device 100 for correcting a sensor signal. The device 100 for correcting a sensor signal comprises an interface 110 for reading in the sensor signal x, which is received by a sensor 120. The sensor 120 can, for example, comprise a rotation rate sensor in the automobile or consumer goods electronics sector and, furthermore, a transducer for providing the sensor signal in a digitally processed form. The interface 110 feeds the sensor signal x to a processing unit 130, the sensor signal x firstly being fed to a digital filter 133 of the processing unit 130, what sensor signal filtered by the digital filter 133 then being fed to a quantizer 135 in order to obtain the processing signal v at the output of the quantizer 135. The digital filter 133 serves the purpose of stabilizing the control circuit and the formation of noise in the signal band of interest. The quantizer 135 has the function of digitizing the signal of the digital filter 133, that is to say converting it in time-discrete and value-discrete fashion. Together with the digital filter, the quantization noise, which results from digitization, is suppressed in the signal band of interest, and a very high signal-to-noise margin is thereby achieved at the output of the converter. On the one hand, the processing signal v is subsequently fed again to the digital filter 133 of the processing unit 130 and, on the other hand, to a feedback unit 140. In the feedback unit 140, a nonlinear processing rule is applied to the processing signal v in order to obtain a feedback signal y which is output to the sensor 120 via a further interface 150. The feedback signal y can at this stage be determined, for example, on the basis of a quadratic relationship between the processing signal v as input signal of the feedback unit 140, and the feedback signal y as output signal of the feedback unit 140. In the converter of the sensor 120, the feedback signal y is then used to influence a recording of a measured value for a physical variable u (such as, for example, an acceleration, a force or a rotation rate). When the sensor 120 is, for example, a micromechanical sensor for capacitive acquisition of a movement of a small vibrating mass, the feedback signal can be used to prestress the vibrating mass capacitively, that is to say electrostatically, in order to vary a resonant frequency of the vibrating mass, and hereby optimize a resolution of specific vibration frequency ranges to be evaluated of the vibrating mass. Owing to the nonlinear relationship, in particular the quadratic relationship between a capacitance and a voltage, it is possible hereby for a processing signal v present as voltage signal to be converted by the feedback unit 140 into the feedback signal y which is then used to charge the capacitance of the sensor 120. The sensor signal x is, however, nonlinearly distorted by the action of the feedback signal y.

In order now to compensate for this nonlinear distortion of the sensor signal x by the action of the feedback signal y, it is now proposed in opposition to the prior art not to design the digital filter 133 and/or the quantizer 135 in a particular way, but to use a correction unit 160 which is implemented as a digital filter in accordance with the block diagram, illustrated in FIG. 1, of an exemplary embodiment of the present disclosure. This correction unit 160 is fed the processing signal v, which is converted into a corrected signal v̱ in the correction unit 160 by using the nonlinear processing rule or a processing rule derived from the nonlinear processing rule. It is to be borne in mind here that the processing rule used in the correction unit 160 should correspond to the nonlinear processing rule used in the feedback unit 140, or to a processing rule derived from this nonlinear rule, in order to achieve a best possible equalization of the sensor signal x or of the processing signal v into the corrected signal V. For example, if there is a nonlinear processing rule in the form of a quadratic relationship between the input signal v of the feedback unit 140 and the output signal y of the feedback unit 140, the processing rule of the correction unit 160 should also be implemented in a quadratic relationship between the input signal v of the correction unit 160 and the output signal v̱ of the correction unit 160, or an inverse quadratic relationship between the input signal v of the correction unit 160 and the output signal v̱ of the correction unit 160 as nonlinear processing rule of the correction unit 160. In this way, the nonlinearity introduced into the sensor signal x by the feedback signal y can be compensated very well, and a corrected signal v̱ can be determined.

Furthermore, it is advantageous when the processing signal v is applied not only to the feedback unit 140, but the processing signal v is also fed to the processing unit 130 itself, in particular to the digital filter 133. In this way, the processing unit 130 has available not only the by the action of the feedback signal y by the nonlinear distorted sensor signal x, but also the processing signal v itself, and so a relatively large quantity of information is available for compensating nonlinear feedback.

FIG. 1 thus shows a system model which uses a device for correcting a sensor signal, the system model a sensor 120, a filter 133, a nonlinear feedback 140, a quantizer 135 and a digital correction filter 160. The filter 133 can output values which are time-continuous, time-discrete and/or value-discrete. The digital correction filter 160 calculates the corrected signal v̱ from the output signal v of the quantizer 135.

In model form, the sensor 120, the processing unit 130 and the feedback unit 140 as well as their arrangement in the signal flow can be understood as a delta-sigma converter. In a delta-sigma converter, the output of the quantizer v normally corresponds to the input signal u=v in the signal band of interest. Owing to a nonlinearity in the feedback 140, the output of the quantizer v no longer corresponds to the input $f(v)=u$. Since, however, only the processing signal v is available in the subsequent signal processing, errors occur hereby which decisively reduce the performance of the sensor. However, this error can be corrected digitally by determining a corrected variable v̱=f(v) so that the corrected variable corresponds again to the input signal u=v̱.

By way of example, this is shown in more detail below for an MEM sensor 120 with capacitive feedback, it being possible for this approach also to be extended to any desired nonlinearities and/or random processes. What has been shown in FIG. 1 is the block diagram of the overall system, comprising sensor 120, filter 133, quantizer 135, nonlinear feedback 140 and digital correction filter 160. All variables (which correspond to signals) are given in scaled form. The characteristic of a capacitive feedback (which is implemented in the feedback unit 140) is the quadratic dependence on the voltage (for example of the signal v). The effect of this is that the feedback is present in accordance with the relationship $f(v)=v^2$, a linear characteristic and two separate electrodes for implementing the sign (for example in the sensor 120) being assumed as DAC transmission behavior. Owing to the high loop gain in the forward path (of the control circuit composed of units of sensor 120, filter 133, quantizer 135 and feedback unit 140) within the signal band of interest, it can be assumed that the feedback $f(v)=v^2$ corresponds to the input signal $u=v^2$. In order to determine the actual input signal u, the output v of the quantizer 135 should therefore be corrected with the same nonlinear transmission function $v̱=v^2=u$. The (correction) function $f(x)=x^2$ is therefore implemented by the digital correction filter 160.

Figure 2:
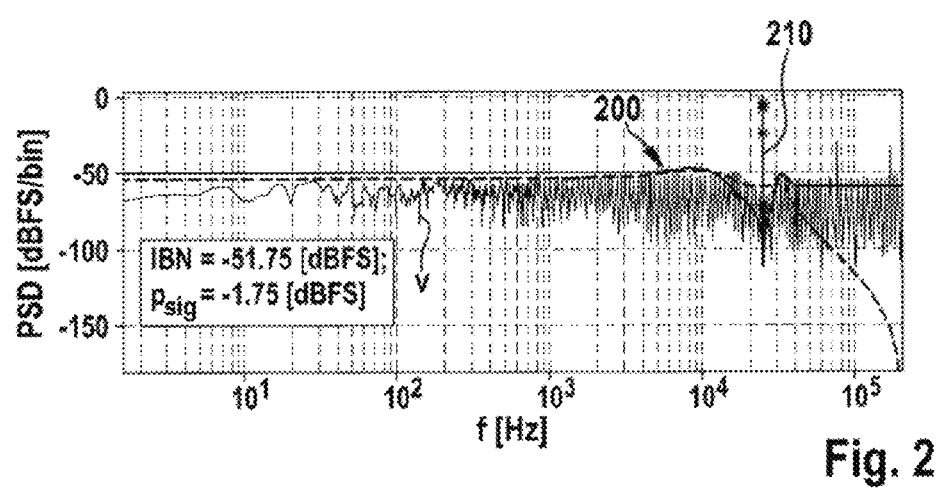
FIG. 2 shows a diagram illustrating a simulation result of the signal quality for different frequencies relating to an embodiment without application of the approach presented here for correcting the sensor signal.

FIG. 2 shows a diagram illustrating a simulation result of the signal quality for different frequencies relating to an embodiment without application of the approach presented here, a MEM sensor with quadratic feedback force having been used as basis. Here, for the illustration from FIG. 2, the signal quality was simulated for a capacitive converter with quadratic dependence of the force characteristic, and the output signal (that is to say the signal v at the output of the quantizer) was spectrally illustrated. As may be seen from FIG. 2, the uncorrected output signal v has a greatly increased IBN in the signal band 200 of interest at the frequency 210, the measurement signal (that is to say the sensor signal x which, in accordance with FIG. 2, represents a nonlinear force characteristic) being strongly distorted in the frequency band 210 of interest.

Figure 3:
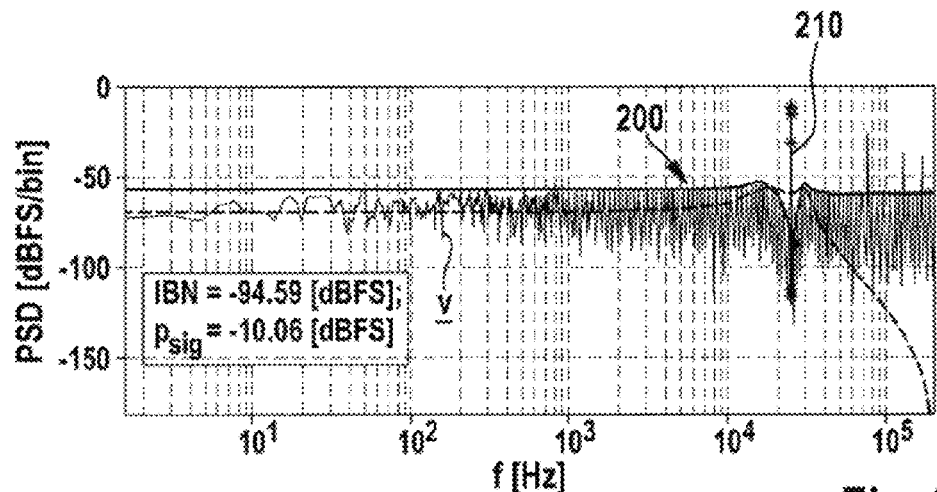
FIG. 3 shows a diagram illustrating a simulation result of the signal quality for different frequencies relating to an embodiment with the use of the approach presented here for correcting the sensor signal.

FIG. 3 shows a diagram illustrating a simulation result of the signal quality for different frequencies relating to an embodiment with the use of the approach, presented above, of a digital correction v̱ of the output signal v of the quantizer, once again the MEM sensor with quadratic feedback force having been taken as basis, as it was also assumed for the simulation from FIG. 2. The corrected signal $v̱=v^2$ has the same IBN as a converter without nonlinear feedback, and the signal power corresponds to the injected signal u of −10 dBFS. As is very well in evidence, the digital correction v̱ of the output signal v of the quantizer leads to a dramatic improvement in the IBN, which is in this case at 40 dB.

Figure 4:
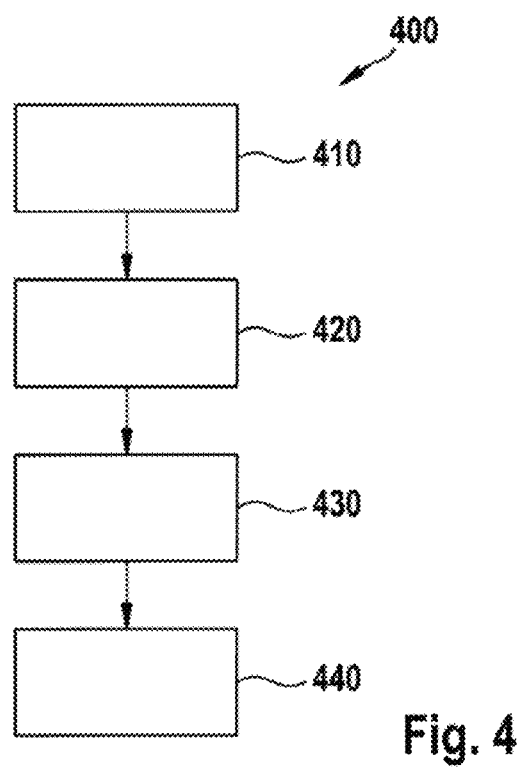
FIG. 4 shows a flowchart of an exemplary embodiment of the present disclosure, as method for correcting the sensor signal.

FIG. 4 shows a flowchart of an exemplary embodiment of the present disclosure, as method 400 for correcting a sensor signal. The method 400 comprises a step of reading in 410 a sensor signal by an interface, the sensor signal representing a physical variable. Furthermore, the method 400 comprises a step of processing 420 the sensor signal by a signal processing unit in order to determine a processing signal by using the sensor signal. Furthermore, the method 400 comprises a step of using a feedback unit to output 430 a feedback signal to the sensor, the feedback unit being designed to provide the feedback signal on the basis of a nonlinear processing rule and the sensor signal and/or the processing signal. Finally, the method 400 comprises a step of correcting 440 the processing signal by means of a signal correction unit in order to determine a corrected signal by using the processing signal, the signal correction unit being designed further to determine the corrected signal by using the nonlinear processing rule or a processing rule derived from the nonlinear processing rule.

The approach presented above therefore serves the aim of undertaking to correct a digitized signal with reference to nonlinearities in the feedback, which can be deterministic (for example, in the case of voltage feedback with a capacitive converter) and/or random (for example, by process controls and also known random variations). It is thereby possible, for example, to dispense with PWM feedback in the case of capacitive converters, and the quantization of the feedback force can be increased to 6-10 bits.

An important aspect of the disclosure is the use of a correction unit (for example a digital correction filter) which maps the nonlinearity function in the digital domain, for example the quadratic voltage profile in the case of capacitive feedback. Consequently, it is possible to dispense with the high frequencies in the case of PWM feedback, thus rendering it possible to implement (sensor) systems with lower power loss or higher resolution. On the other hand, it is also possible to dispense with complicated DACs (DAC=Digital-Analog-Converter) with root transfer function, which have a very large area and power loss. A further advantage of the approach proposed here is the possibility of correcting random variations if they either are known or not variable, which can otherwise increase the IBN (IBN=In-Band Noise).

The completely digital implementation of a correction of a nonlinearity which can be realized by the approach presented here simplifies the analog circuit design and enables cost advantages through scaling with future ASIC processes. In addition, the approach through digital implementation is independent of process variations.

As an alternative to the mode of procedure presented above, it is also possible to carry out compensation of systematic errors in the case of PWM feedback. Again, it is possible to undertake to adjust the digital correction filter at the band end. Finally, the use of an adaptive learning algorithm for online/offline determination of the digital correction filter is also conceivable.

The inventive method steps can be repeated and executed in a sequence other than that described. Furthermore, if an exemplary embodiment includes an "and/or" conjunction between a first feature and a second feature, this is to be read to the effect that in accordance with one embodiment the exemplary embodiment has both the first feature and the second feature, and in accordance with a further embodiment it has either only the first feature or only the second feature.

What is claimed is:

1. A device for correcting a sensor signal, comprising:
a sensor interface configured to read in a sensor signal from a sensor configured to measure a physical variable;
a signal processing unit formed by a first digital filter and a quantizer, the quantizer being connected downstream of the first digital filter, the signal processing unit being connected to an output of the sensor interface and configured to determine a processing signal by using the sensor signal;
a feedback unit connected to an output of the signal processing unit and configured (i) to output a feedback signal to the sensor, and (ii) to provide the feedback signal to the sensor on the basis of a nonlinear processing rule and the processing signal; and
a signal correction unit formed by second digital filter, the signal correction unit being connected to the output of the signal processing unit and configured (i) to determine a corrected signal based on the processing signal which is provided to the feedback unit, and (ii) to determine the corrected signal based on at least one of the nonlinear processing rule and a processing rule derived from the nonlinear processing rule, the signal correction unit being arranged downstream of the processing signal which is provided to the feedback unit.

2. The device according to claim 1, wherein at least one of the feedback unit and the signal correction unit uses at least one of a nonlinear processing rule and a processing rule derived from the nonlinear processing rule which is based on a quadratic relationship between an input variable and an output variable.

3. The device according to claim 1, wherein the signal processing unit is configured to determine the processing signal as a time-discrete and value-discrete signal.

4. The device according to claim 1, wherein the signal processing unit is configured to further provide the processing signal by using the processing signal itself.

5. The device according to claim 1, wherein the sensor is configured (i) to acquire a movement of a micromechanical element, in particular to provide the sensor signal by acquiring a change in a capacitance.

6. A method for correcting a sensor signal, comprising:
reading in a sensor signal by a sensor interface connected to a sensor, the sensor signal representing a physical variable;
processing the sensor signal by a signal processing unit in order to determine a processing signal by using the sensor signal, the signal processing unit being formed by a first digital filter and a quantizer, the quantizer being downstream of the first digital filter, the signal processing unit being connected to an output of the sensor interface;
outputting a feedback signal by a feedback unit to the sensor, the feedback unit being connected to an output of the signal processing unit and configured to provide the feedback signal on the basis of a nonlinear processing rule and the processing signal; and
correcting the processing signal using a signal correction unit configured (i) to determine a corrected signal based on the processing signal which is provided to the feedback unit and (ii) to determine the corrected signal based on at least one of the nonlinear processing rule and a processing rule derived from the nonlinear processing rule, the signal correction unit being formed by second digital filter, the signal correction unit being connected to the output of the signal processing unit and arranged downstream of the processing signal which is provided to the feedback unit.

7. The method of claim 6, wherein:
a computer program product includes program code configured to carry out the method, and
the program code is executed on a device that includes, the interface, the signal processing unit, the feedback unit, and the signal correction unit.

* * * * *